J. ANDRADE.
SYSTEMATIC ASSOCIATION OF CYLINDRICAL SPRINGS.
APPLICATION FILED JULY 30, 1912.
1,151,432.
Patented Aug. 24, 1915.
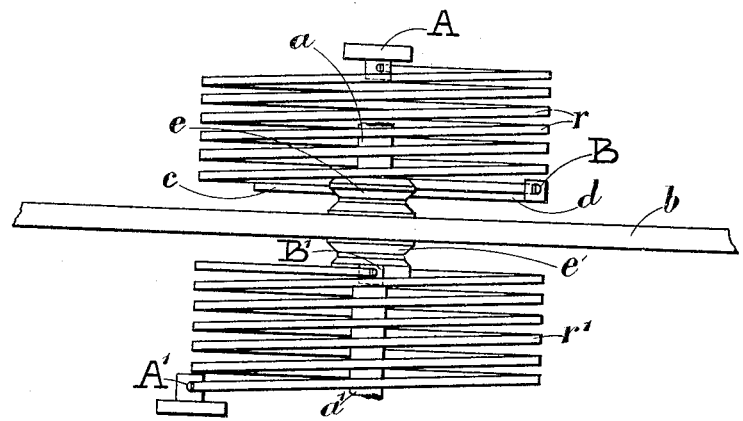
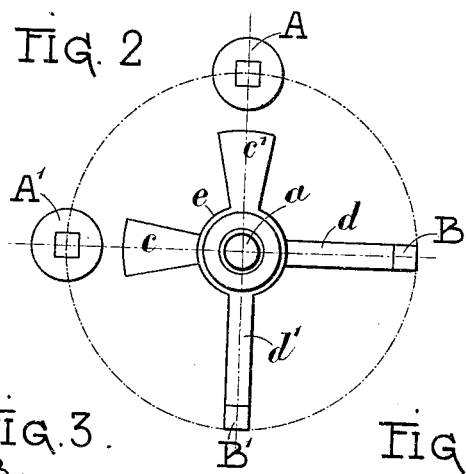
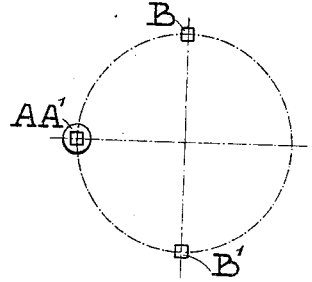
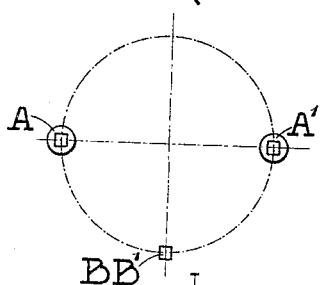
WITNESSES
INVENTOR

UNITED STATES PATENT OFFICE.

JULES ANDRADE, OF BESANÇON, FRANCE.

SYSTEMATIC ASSOCIATION OF CYLINDRICAL SPRINGS.

1,151,432.

Specification of Letters Patent. Patented Aug. 24, 1915.

Application filed July 30, 1912. Serial No. 712,367.

*To all whom it may concern:*

Be it known that I, JULES ANDRADE, citizen of the Republic of France, residing at Besançon, in the Republic of France, have invented a new and useful Systematic Association of Cylindrical Springs; and I do hereby declare the following to be a full, clear, and exact description of the same.

Pierre Leroy was the first to ascertain that in any cylindrical balance springs of sufficient extent, there is a certain length at which all the vibrations, great or small, are of the same duration. This condition of isochronism related to balance springs which only had two coils with amplitudes of the regulating member not exceeding 120°. In order to take account of balance springs actually used, the conditions of isochronism of the spring without terminal curves discovered by Leroy must be rectified as follows:—For a spiral of 10 turns or more there are in each coil two points diametrically opposite and at right angles to the point at which the spring is fixed to the body of the chronometer, which permit of isochronism being obtained by taking them as points of attachment to the collet. The researches of M. Caspari have verified the theoretical exactitude of Leroy's method which in effect produces isochronism but without obtaining the simple or sinusoidal clockwork movement for ascertaining the proportionality of the effect of the force of the spring to the angle moved through by the balance from its zero position.

The present invention has for its object to effect isochronism by Leroy's method while retaining for the regulating member the single clockwork movement not obtained by Leroy, which is of importance for the division into fractions of the vibrations and secures certain advantages from the point of view of the regulation of precision.

The new regulating device comprises two identical spiral springs secured independently of each other on each side of the balance to respective studs, the points of attachment to the balance of each of the springs making with the corresponding stud an angle equal to 90°.

The employment of two springs in a regulating member is not new; Thomas Mudge and Ferdinand Berthoud among others have made attempts of this kind, but they used flat springs to which the present method does not apply, and in other respects, the object which these men had in view was totally different from that sought to be obtained by the present invention.

An embodiment of the invention is represented by way of example in the annexed drawing in which—

Figure 1 shows the two springs fixed to the balance and to the studs respectively. Fig. 2 is a plan showing the relative positions of the points of attachment of the springs to the balance and to the studs. Figs. 3 and 4 show diagrammatically modifications in which the relative positions of each of the two springs are different from those of Fig. 2.

The regulating device shown in Figs. 1 and 2 comprises two identical balance springs $r$ and $r'$ fixed independently of each other at each side of the balance $b$ of which $a$ and $a'$ are the upper and lower parts of the balance staff. On the upper part $a$ of the balance staff is provided the collet $e$ having arms $c$ and $d$ (Fig. 2). The lower part $a'$ carries a similar collet having arms $c'$ and $d'$ (Fig. 2).

A and A' are the respective studs of each of the portions of the balance spring.

The balance spring $r$ is secured at one end to the balance by the end B of the arm $d$ of the collet $e$ and at the other end to the stud A.

The spring $r'$ is secured to the balance by the end B' of the arm $d'$ of the collet $e'$ and at the other end to the stud A'.

As shown in Fig. 2, the points of attachment B, B' of each of the springs to the balance form with the corresponding studs A and A' an angle equal to 90° *i. e.* 90° between the points A, B and 90° between A' and B'.

In the embodiment shown in Fig. 2 the relative position of the points of attachment A and B relatively to those A' and B' corresponds to the cruciform arrangement of the arms $c$, $d$ and $c'$, $d'$ of the collets. This arrangement leaves optional the angular distance B, B'; it may for example be modified as shown in Figs. 3 and 4.

In Figs. 3 and 4, A and A' are the studs, B and B' the points of attachment to the collet of the balance.

The two balance springs $r$ and $r'$ are of identical construction and dimensions and shape, and this condition is best obtained by cutting the springs $r$ and $r'$ from a single spring.

I claim:—

1. A regulating device for chronometers, comprising a balance, a balance spring of the same curvature throughout and arranged at one side of said balance, an exactly similar balance spring arranged at the other side of said balance, means for attaching one of said springs to the balance, independent means for attaching the other of said springs to said balance, and means for attaching each of said springs also to said chronometer, each of said means for attaching said springs to the balance forming, with the respective means for attaching the springs also to said chronometer, an angle of 90°.

2. A regulating device for chronometers, comprising a balance, a balance staff, a balance spring of the same curvature throughout and arranged on said balance staff at one side of the balance, an exactly similar balance spring independent of the first arranged on the balance staff at the other side of said balance, a collet on one side of said balance and a collet on the other side of said balance, means on one of said collets providing for the attachment of one of the said balance springs to the balance, means on the other of said collets providing for the attachment of the other of said springs to the balance and studs for attaching each of said balance springs to the chronometer, each of the means providing for the attachment of the balance springs to the balance forming with the corresponding stud an angle of 90°.

3. A regulating device for chronometers, comprising a balance; a balance staff; a balance spring of the same curvature throughout and arranged on said balance staff at one side of the balance, an exactly similar balance spring independent of the first arranged on the balance staff at the other side of said balance, a collet on one side of said balance and a collet on the other side of said balance, an arm on one of said collets providing for the attachment of one of the said balance springs to the balance, an arm on the other of said collets providing for the attachment of the other of said springs to the balance and studs for attaching each of said balance springs to the chronometer, each of the arms providing for the attachment of the balance springs to the balance forming with each other and the corresponding stud an angle of 90°.

In testimony whereof, I have signed my name to this specification in the presence of two subscribing witnesses.

JULES ANDRADE.

Witnesses:
R. L. NAVASSEUR,
J. BEAUVERIE.

Copies of this patent may be obtained for five cents each, by addressing the "Commissioner of Patents, Washington, D. C."